United States Patent [19]

Yamamura

[11] Patent Number: 5,073,737
[45] Date of Patent: Dec. 17, 1991

[54] MAGNETIC BEARING DEVICE
[75] Inventor: Akira Yamamura, Tokyo, Japan
[73] Assignee: Nippon Ferrofluidics Corporation, Tokyo, Japan
[21] Appl. No.: 560,460
[22] Filed: Jul. 27, 1990

Related U.S. Application Data

[63] Continuation of Ser. No. 418,316, Oct. 6, 1989, abandoned.

[30] Foreign Application Priority Data

Oct. 7, 1988 [JP] Japan .................................. 63-254621

[51] Int. Cl.$^5$ .............................................. H02K 7/09
[52] U.S. Cl. ................................................... 310/90.5
[58] Field of Search ............................ 310/90.5, 154; 324/207.16, 207.15

[56] References Cited

U.S. PATENT DOCUMENTS

| | | | |
|---|---|---|---|
| 4,167,296 | 9/1979 | Dendy | 310/90.5 |
| 4,353,602 | 10/1982 | Habermann | 310/90.5 |
| 4,609,869 | 9/1986 | Metcalf | 324/207.11 |
| 4,879,500 | 11/1989 | Kanemitsu | 310/90.5 |
| 4,920,291 | 4/1990 | McSparran | 310/90.5 |
| 4,942,321 | 7/1990 | Kanemitsu | 310/90.5 |

FOREIGN PATENT DOCUMENTS 0311122  4/1989  European Pat. Off. ........... 310/90.5

*Primary Examiner*—R. Skudy
*Attorney, Agent, or Firm*—Armstrong, Nikaido, Marmelstein, Kubovcik & Murray

[57] ABSTRACT

The invention discloses a magnetic bearing device having a rotary main shaft, an armature disk mounted on the rotary main shaft, and a pair of bearing elements disposed on opposite sides in axial direction of the armature disk. Each of bearing elements includes a control coil provided with a pair of pole pieces, wherein a top end of each of the pole pieces is disposed near to the armature disk, and the pole pieces are mounted with a sensor coil at a position nearer to a front end side of the control coil.

2 Claims, 4 Drawing Sheets

MAGNETIC BEARING DEVICE

This application is a continuation of application Ser. No. 418,316 filed Oct. 6, 1989, now abandoned.

BACKGROUND AND SUMMARY OF THE INVENTION

This invention relates to a magnetic bearing device.

An object the invention is to provide a magnetic bearing device of compact construction by which the linear displacement output is obtained.

BRIEF DESCRIPTION OF THE INVENTION

DESCRIPTION OF PREFERRED EMBODIMENT

With reference to the accompanying drawings, a preferred embodiment of the magnetic bearing device is hereinafter described.

Figure 1:
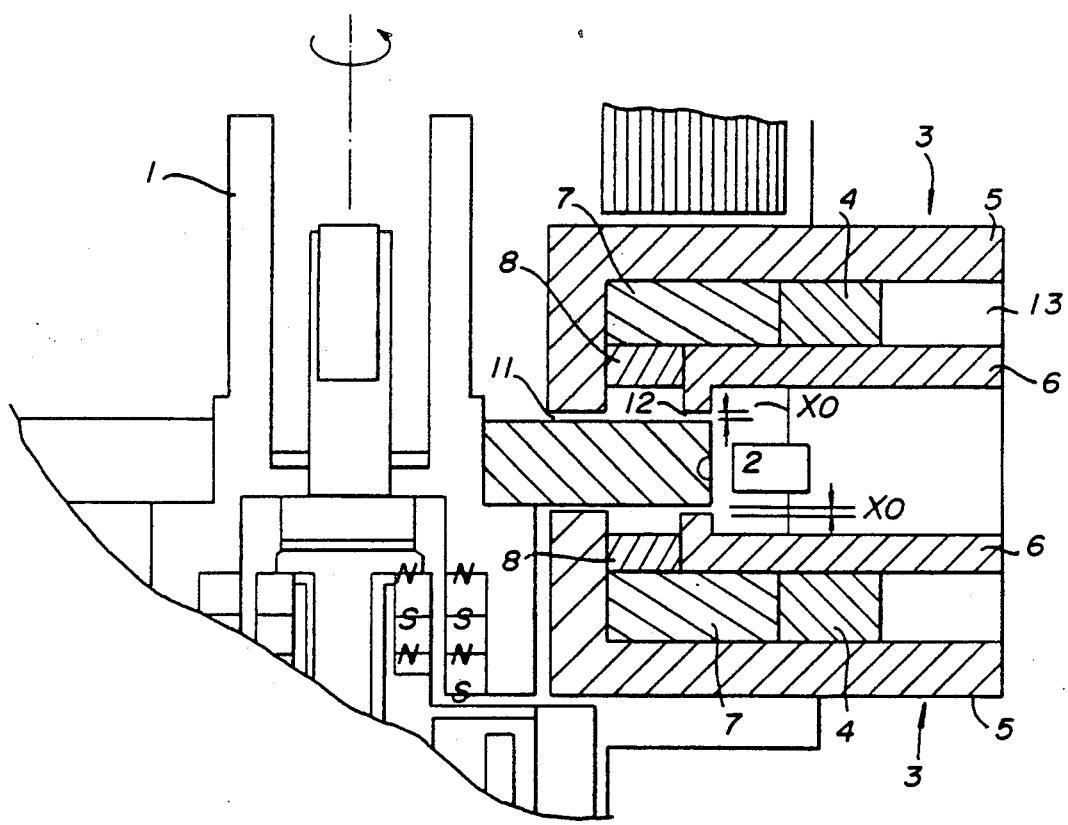
FIG. 1 is a longitudinal sectional view showing an embodiment of the magnetic bearing device according to this invention.

Referring to FIG. 1, numeral 1 indicates a main rotary shaft which is rotatably provided with an armature disk 2 thereby forming an integral unit. A pair of bearing elements 3, 3 are disposed on opposite sides in the axial direction of the armature disk 2 putting the disk 2 therebetween. Each of the bearing elements 3, 3 comprises a pair of pole pieces 5, 6 mounted on two pole faces of a permanent magnet 4 along with a control coil 7. Each of the pole pieces 5, 6 has a part extending in parallel with the armature disk 2 and a top end part further extending from the mentioned part to a position adjacent the armature disk. A control coil 7 is disposed between each mentioned pair of pole pieces 5, 6 at a position nearer to the front end side than the permanent magnet 4. A sensor coil 8 is disposed at a position closer to the front end side than the mentioned control coil 7. The sensor coil 8 is wound in the same direction as the mentioned control coil 7.

Figure 2:
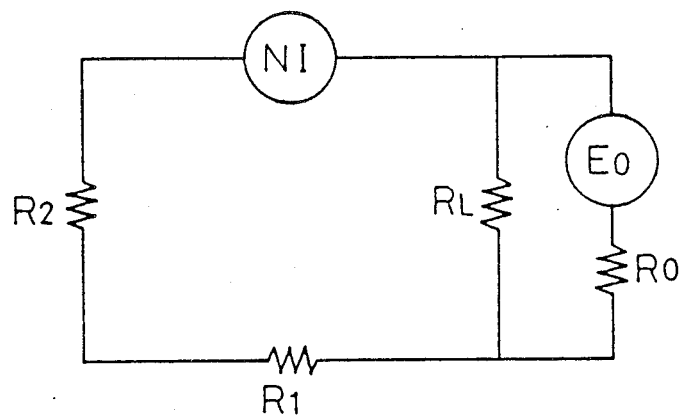
FIG. 2 is an equivalent circuit diagram of the above device.

In the magnetic bearing device of the above construction, first and second gaps 11, 12 are respectively formed on the tip end sides of the pole pieces 5, 6, and a leakage magnetic path 13 is formed on the base end sides of the pole pieces 5, 6, of which the equivalent circuit is shown in FIG. 2. In this circuit diagram, reference EO indicates the magnetomotive force of the permanent magnet 4, RO indicates internal magnetic resistance thereof NI is the magnetic force of the control coil 7 where N is the number of turns in the control coil and I is the control, RL indicates magnetic resistance for leakage flux, R1 indicates magnetic resistance for the first gap 11, and R2 indicates magnetic resistance for the second gap 12.

In the construction described above, unbalance spring constant as a result of displacement of the armature disk 2 is in proportion to the following expression:

$$1/[1 + RO/(1 + RO/R1)(R1 + R2)]$$

Controlling force is in proportion to the following expression:

$$EO \cdot NI/R$$

$$R = (R1 + R2)^2(1 + RO/RL) + 2RO(R1 + R2) + RO^2/(1 + R2/RL)$$

Accordingly, a maximum value is obtained at the time of $$RL = RO(R1 + R2)/[RO - (R1 + R2)]$$
$$= RO/(a - 1)$$

where: $RO = a(R1 + R2)$, $a$ being a constant

As mentioned above, the magnetic resistance of the magnetic path of the control coil 7 can be optimized by enlarging the gap between pole faces N and S of the permanent magnet 4, increasing the internal magnetic resistance RO (for instance, by forming the pole pieces 5, 6 of some soft magnetic substance) and forming the leakage path of the permanent magnet 4. Control characteristics with control current can be improved by disposing the control coil 7 on the side nearer to the front end than the permanent magnet 4. As a result of this, not only can unbalanced spring constants due to the displacement of the armature disk be reduced, but also the entire construction can be simplified.

Figure 3:
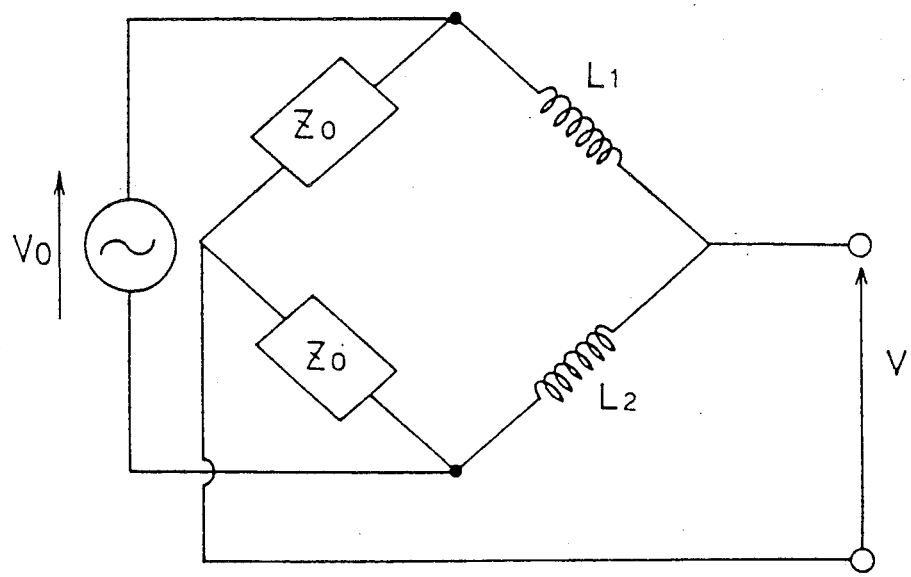
FIG. 3 is a schematic diagram showing the working principle of the displacement detecting sensor.

FIG. 3 is a schematic diagram showing the principle of displacement detection by a displacement detecting sensor. The displacement detecting sensor comprises the sensor coil 8 and the armature disk 2 (magnetic substance), and a high frequency current (about 50 KHz) is applied to the coil 8. When changing distance between the sensor coil 8 and the armature disk 2, inductance of the coil 8 varies in such a manner that the amplitude of the high frequency applied to the coil 8 is modulated. Such a modulated amount is detected by a detector as displacement. A detector circuit is formed into a bridge comprising two impedances Z0, Z0 and two sensor coils L1, L2 so that the displacement signal is outputted by a detection circuit, after differentially detecting the modulated amount.

Noise at the time of composing the control coil 7 and the sensor coil 8 together is not extremely high, despite a strong magnetic field being generated in the control coil 7 of which the attractive force is increased, though the amount of inductance variation reaches a certain value. This is because the sensor coil 8 is relatively distant from the armature disk 2. On the other hand, also in the control coil 7 of which the attractive force is decreased, the amount of inductance variation of the sensor coil 8 is almost the same as the mentioned certain value, despite the magnetic field generated being not so strong. This is because the distance between the sensor coil 8 and the armature disk 2 is shorter. In this manner, adoption of the differential detection system described above makes it possible to offset the amount of variation between each other, and there is no detection in the form of a displaced component, eventually resulting in accurate and precise detection of displacement.

Establishing that:

L1, L2: inductances of sensor coil,
Z0: reference impedance of the bridge,
: magnetic permeability of the gap,
S: sectional area of the magnetic core of the sensor coil,
Ns: number of turns in the sensor coil,
x0: distance to sensor target at balanced point,
x: displacement from x0, and w: angular frequency of voltage V0 applied to coil,
output voltage V of the bridge is expressed as follows:

$$V = V0(jwL2 - jwL1)/2(jwL1 + JwL2)$$
$$= V0(L2 - L1)/2(L1 + L2).$$

Then, further establishing that:

$$L1 = \mu N s^2/2(x0 - x)$$
$$= a/(x0 - x), \text{ and}$$
$$L2 = \mu N s^2/2(x0 + x)$$
$$= a/(x0 + x),$$

a following expression is obtained:

$$V = -V0 \times /2 \times 0$$

Accordingly, an electric signal in proportion to the displacement can be obtained. Since V is a high frequency voltage of several 10 Khz of which the amplitude is in proportion to displacement, any displacement signal can be outputted by eliminating the high frequency component through detection.

As described above, in the axial displacement detection mechanism according to this embodiment, since the sensor coil 8 has its magnetic path in common with the control coil 7, space can be saved. Furthermore, as a result of employing the differential detection mechanism as described above, the output of the sensor is zero when the armature disk 2 is in the center between the two bearing elements 3, 3. Thus, not only can irregularity among individual components be reduced but also the linear sensor output with respect to displacement can be obtained.

Figure 4:
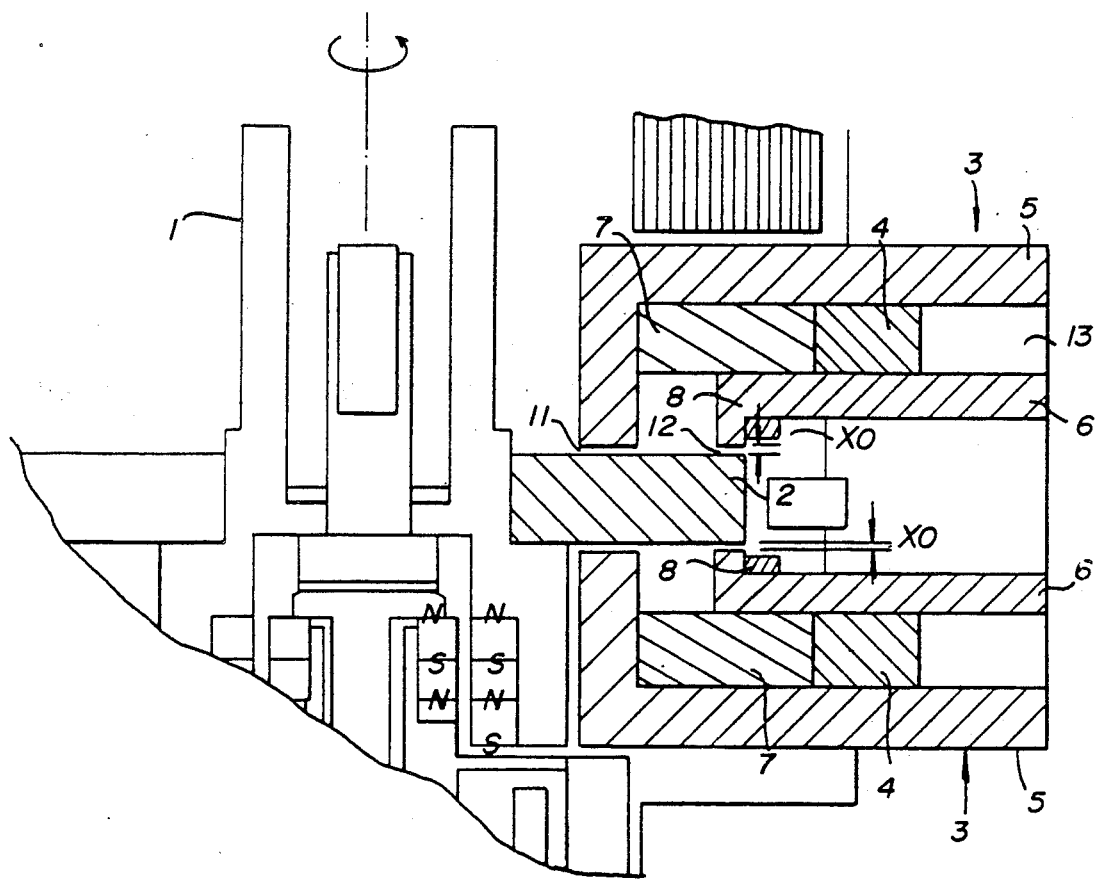
FIG. 4 is a longitudinal sectional view of another embodiment.

In addition, in the embodiment, it is also preferable to dispose the sensor coil 8 at a position as shown in FIG. 4 outside the pole pieces 6 instead of between the pole pieces 5, 6 as shown in FIG. 1.

Thus, in the axial displacement detection mechanism of the above construction according to this invention, since the sensor coil has its magnetic path in common with the control coil, an advantage of saving space can be achieved. Furthermore, as a result of employing the differential detection mechanism as described above, a linear sensor output with respect to displacement can be obtained.

What is claimed is:

1. A magnetic bearing device comprising:
    a rotary main shaft;
    an armature disk mounted on said rotary main shaft; and
    a pair of bearing elements disposed on opposite sides along an axial direction of said armature disk, each of said bearing elements including a control coil provided with a pair of pole pieces, a top end of each of said pole pieces being disposed near said armature disk, and said pole pieces being provided with a sensor coil at a position nearer to a front end side of said control coil whereby the sensor coil has a magnetic path common with the control coil.

2. A magnetic bearing device according to claim 1, wherein displacement of said main shaft is differentially outputted by said sensor coils disposed on opposite sides along the axial direction of said armature disk.

* * * * *